(12) United States Patent
Borunda et al.

(10) Patent No.: US 6,938,959 B1
(45) Date of Patent: Sep. 6, 2005

(54) BUS SEAT BELT SYSTEM

(76) Inventors: Timmy R. Borunda, P.O. Box 96, Hartman, CO (US) 81043; Marie F. Borunda, P.O. Box 96, Hartman, CO (US) 81043

( * ) Notice: Subject to any disclaimer, the term of this patent is extended or adjusted under 35 U.S.C. 154(b) by 0 days.

(21) Appl. No.: 11/009,622

(22) Filed: Dec. 13, 2004

(51) Int. Cl.[7] .............................................. B60N 2/00
(52) U.S. Cl. ................................ 297/483; 297/DIG. 6
(58) Field of Search ............................... 297/483, 468, 297/464, DIG. 3, DIG. 6, 232; 280/801.1, 280/808

(56) References Cited

U.S. PATENT DOCUMENTS

| | | | |
|---|---|---|---|
| 1,642,911 A * | 9/1927 | Thurnau .......................... | 182/3 |
| 3,871,470 A | 3/1975 | Schwanz et al. | |
| 3,888,509 A | 6/1975 | Willey | |
| 4,142,737 A | 3/1979 | Marsh et al. | |
| 4,143,914 A | 3/1979 | Klich | |
| 4,768,828 A * | 9/1988 | Kohketsu ................... | 297/250.1 |
| 4,832,367 A * | 5/1989 | Lisenby ....................... | 280/808 |
| 4,973,083 A * | 11/1990 | Richards et al. .......... | 280/801.1 |
| 5,135,257 A * | 8/1992 | Short ........................... | 280/808 |
| 5,137,335 A | 8/1992 | Marten | |
| 5,397,073 A | 3/1995 | Fujimura | |
| 6,203,110 B1 | 3/2001 | Proteau et al. | |
| 6,769,157 B1 * | 8/2004 | Meal ........................... | 24/633 |

* cited by examiner

Primary Examiner—Milton Nelson, Jr.
(74) Attorney, Agent, or Firm—Donald R. Schoonover

(57) ABSTRACT

A seat belt system for use on a bus or like vehicle includes a ring to which two lap belt elements and a shoulder belt element are attached. One of the lap belt elements has hook-and-loop fastener material on an end thereof that fits into the ring whereby the size of the seat belt system can be adjusted and the seat belt system can be easily and quickly opened if necessary.

2 Claims, 1 Drawing Sheet

BUS SEAT BELT SYSTEM

BACKGROUND OF THE INVENTION

1. Field of the Invention

The present invention relates to the general art of land vehicles, and to the particular field of safety belts or harnesses.

2. Discussion of the Related Art

Studies have concluded that wearing seat belts in a land vehicle saves many lives and prevents many injuries. In fact, many States have laws requiring the use of seat belts, and some insurance companies will not pay for injuries sustained in a land vehicle crash if a rider is shown not to have been wearing a seat belt.

Accordingly, the land vehicle art contains many examples of seat belts and seat belt systems. However, the inventor is not aware of any seat belt system that is suitable for use on a bus. A bus has passengers that get on and off the bus, and a single seat may have many such passengers during a single route. Unlike a car where a single passenger is in a seat for the entire trip, a bus has passengers in and out of seats all the time.

As such, a seat belt that is suitable for a passenger vehicle may not be suitable for use on a bus. One reason for this is that a passenger on a bus will require much greater ease of use of the seat belt than a passenger in a car since the bus passenger is likely to be in and out of the seat quickly, and may have to step over a fellow passenger to move into or out of the seat.

Therefore, there is a need for a seat belt system that is suitable for use on a bus.

The problems associated with seat belts in a bus are exacerbated when the passengers are children. Children may not have sufficient manual dexterity to operate a seat belt buckle, especially if there is some urgency to the operation, such as may be the case in an accident. Accordingly, some school buses do not have seat belts for this reason. However, since seat belts are so beneficial, especially in an accident, school buses should have seat belts.

Therefore, there is a need for a seat belt system that is suitable for use on a school bus.

The same reasoning applies to buses that carry passengers that may have manual dexterity deficiencies, such as the aged or the disabled.

Therefore, there is a need for a seat belt system that is suitable for use on a bus that may carry passengers having a manual dexterity deficiency.

Still further, a bus may carry passengers of all sizes; whereas, a car may have passengers that are generally the same each time. Accordingly, a seat belt system in a car does not need to be as easily adjustable as a seat belt system in a bus.

Therefore, there is a need for a seat belt system that is easily adjustable.

While adjustability is a goal, safety is much more important in the situation of a seat belt system. Accordingly, any seat belt system should be secure while being easily adjustable.

Therefore, there is a need for a seat belt system that is secure while still being easily adjustable and easily operated.

Since there are millions of buses presently on the road, to be most successful, any seat belt system must be easy and inexpensive to retrofit into an existing bus. If it is expensive or difficult to retrofit a seat belt system into an existing bus, such a system will not be used.

Therefore, there is a need for a seat belt system that is easily retrofit into an existing vehicle.

PRINCIPAL OBJECTS OF THE INVENTION

It is a main object of the present invention to provide a seat belt system that is suitable for use on a bus.

It is another object of the present invention to provide a seat belt system that is suitable for use on a school bus.

It is another object of the present invention to provide a seat belt system that is suitable for use on a bus that may carry passengers having a manual dexterity deficiency.

It is another object of the present invention to provide a seat belt system that is easily adjustable.

It is another object of the present invention to provide a seat belt system that is secure while still being easily adjustable and easily operated.

It is another object of the present invention to provide a seat belt system that is easily retrofit into an existing vehicle.

SUMMARY OF THE INVENTION

These, and other, objects are achieved by a bus seat belt system which comprises a vehicle seat unit which includes a back section and a seat section; a seat belt unit which includes a first lap belt element which is fixedly attached to the vehicle seat, a second lap belt element which is fixedly attached to the vehicle seat, a shoulder belt element which is fixedly attached to the vehicle seat; a ring which is fixedly attached to the first lap belt element and to the shoulder belt element; and the second lap belt element having a second end which includes hook-and-loop fastener elements.

Using the bus seat belt system embodying the present invention will permit a bus rider to quickly and easily secure himself into a seat yet which will permit that rider to quickly and easily release the seat belt to allow him to quickly and easily exit the seat. The seat belt system of the present invention is also easily installed in a bus, and can be easily retrofit to an existing bus.

BRIEF DESCRIPTION OF THE DRAWING FIGURES

DETAILED DESCRIPTION OF THE PREFERRED EMBODIMENT

Other objects, features and advantages of the invention will become apparent from a consideration of the following detailed description and the accompanying drawings.

Referring to the Figures, it can be understood that the present invention is embodied in a bus seat belt system 10 that achieves the above-stated objectives.

Figure 2:
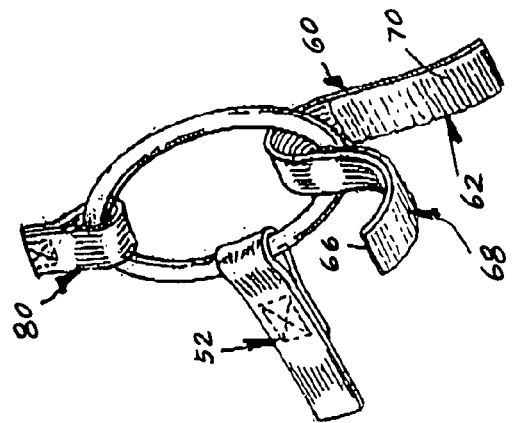
FIG. 2 is a detail of one of the seat belts included in the bus seat belt system shown in FIG. 1.
Figure 1:
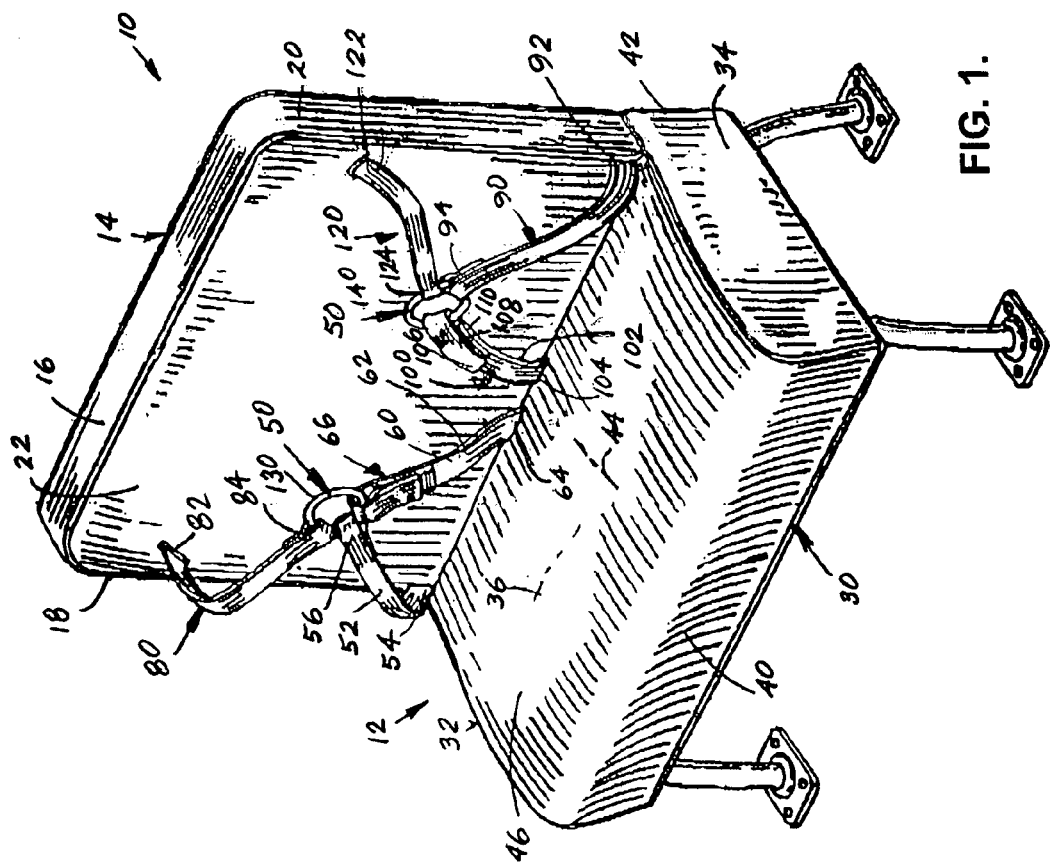
FIG. 1 is a perspective view of a bus seat belt system embodying the present invention.

System 10 comprises a seat unit 12 such as is commonly found on a bus. Seat unit 12 has a back support section 14 which includes a first wall 16 which is a top wall when seat unit 12 is in use, a first side wall 18, a second side wall 20, and a first surface 22 that is a front surface when seat unit 12 is in use. It is noted that the use position for seat unit 12 is shown in FIG. 1.

Seat unit 12 further includes a seat section 30 that includes a first end wall 32, a second end wall 34, and a longitudinal axis 36 which extends between first end wall 32 and second end wall 34. Seat unit 12 further includes a first side wall 40, a second side wall 42, and a transverse centerline 44 which extends midway between end walls 32 and 34 and extends between first side wall 40 and second side wall 42.

A first surface 46 of seat section 30 is a top surface when seat unit 12 is in use.

A seat belt unit 50 safely secures a passenger in place in seat unit 12 while being easy to install, easy to operate and easy to adjust.

Seat belt unit 50 includes a first belt 52 having a first end 54 fixed to back support section 14 adjacent to first side wall 18 and a second end 56.

A second seat belt 60 has a body 62 with a first end 64 fixed to seat section 30 at a location that is spaced apart from first end wall 32 and is located near transverse centerline 44, and a second end 66. Second seat belt 60 has a first section of hook-and-loop fastener material 68 thereon adjacent to second end 66 and a second section of hook-and-loop fastener material 70 thereon at a location spaced apart from first section of hook-and-loop material 68. First section of hook-and-loop fastener material 68 is adapted to releasably engage second section of hook-and-loop material 70 to releasably attach second end 66 to body 62 of the second seat belt 60. The first and second seat belts 52, 60 form a lap belt when seat belt unit 12 is in use.

A third seat belt 80 has a first end 82 fixed to front surface 22 of back support section 14 at a location that is spaced apart from first end 54 of first seat belt 52. Third seat belt 80 has a second end 84 and is a shoulder strap when seat belt unit 12 is in use.

A fourth belt 90 has a first end 92 fixed to back support 14 adjacent to second side wall 20 of the back support section 14 and a second end 94.

A fifth seat belt 100 has a body 102 with a first end 104 fixed to seat section 30 at a location that is spaced apart from second end wall 34 and is located near transverse centerline 44, and a second end 106. Fifth seat belt 100 has a first section of hook-and-loop fastener material 108 thereon adjacent to second end 106 and a second section of hook-and-loop fastener material 110 thereon at a location spaced apart from first section of hook-and-loop material 108. First section of hook-and-loop fastener material 108 is adapted to releasably engage second section of hook-and-loop material 110 to releasably attach second end 106 to body 102. The fourth and fifth seat belts 90, 100 form a lap belt when seat belt unit 50 is in use.

A sixth seat belt 120 has a first end 122 fixed to front surface 22 of back support section 14 at a location that is spaced apart from first end 92 of fourth seat belt 90. The sixth seat belt 120 has a second end 124 and is a shoulder strap when seat belt unit 50 is in use.

A first ring 130 has the second ends 56, 84 of the first and third seat belts 52, 80 fixedly attached thereto and the second end 66 of the second seat belt 60 releasably attached thereto by means of the hook-and-loop fastener sections when seat belt unit 50 is in use.

A second ring 140 has the second ends 94, 124 of the fourth and sixth seat belts 90, 120 fixedly attached thereto and the second end 106 of the fifth seat belt 100 is releasably attached thereto by means of the hook-and-loop fastener sections when said seat belt unit 50 is in use.

Use and operation of seat belt system 10 can be understood from the teaching of the foregoing discussion. Accordingly, the use and operation of system 10 will not be discussed in detail. A passenger of a bus can sit in seat unit 12 and pull either the first and third seat belts 52, 80 around him or the fourth and sixth seat belts 90, 120 around him.

After positioning these seat belts, the passenger will pull either the second or the fourth seat belt 60, 90 around him and attach that seat belt to the appropriate ring 130, 140 by means of the hook-and-loop fastening materials. The size of the seat belt can be easily adjusted using the hook-and-loop fastening materials. Releasing the seat belts follows the opposite steps.

It is observed that because of the orientation of the third and sixth seat belts 80, 120 with respect to the second and fifth seat belts 60, 100, any stress placed on the seat belts will be oriented along a direction that the hook-and-loop materials are the strongest, that is longitudinally of the second and fifth seat belts 60, 100. Such stress may be associated with an accident or the like.

It is understood that while certain forms of the present invention have been illustrated and described herein, it is not to be limited to the specific forms or arrangements of parts described and shown.

What is needed and desired to be covered by Letters Patent is as follows:

1. A bus seat belt system comprising:
   (a) a seat unit having
      (1) a back support section, the back support section including
         (A) a first wall which is a top wall when said seat unit is in use,
         (B) a first side wall,
         (C) a second side wall, and
         (D) a first surface that is a front surface when said seat unit is in use, and
      (2) a seat section, the seat section including
         (A) a first end wall,
         (B) a second end wall,
         (C) a longitudinal axis which extends between the first end wall of the seat section and the second end wall of the seat section,
         (D) a first side wall,
         (E) a second side wall,
         (F) a transverse centerline which extends midway between the first end wall of the seat section and the second end wall of the seat section and which extends between the first side wall of the seat section and the second side wall of the seat section, and
         (G) a first surface which is a top surface when said seat unit is in use; and
   (b) a seat belt unit which includes
      (1) a first seat belt having a first end fixed to the back support section of said seat unit adjacent to the first side wall of the back support section and a second end,
      (2) a second seat belt having a body with a first end fixed to the seat section at a location that is spaced apart from the first side wall of the seat section and is located near the transverse centerline of the seat section, and a second end, the second seat belt having a first section of hook-and-loop fastener material thereon adjacent to the second end of the second seat belt and a second section of hook-and-loop fastener material thereon at a location spaced apart from the first section of hook-and-loop material, the first section of hook-and-loop fastener material being adapted to releasably engage the second section of hook-and-loop material to releasably attach the second end of the second seat belt to the body of the second seat belt, the first and second seat belts being a lap belt when said seat belt unit is in use, (3) a third seat belt having a first end fixed to the front surface of the back support section at a location that is spaced apart from the first end of the first seat belt, the third seat belt has a second end and is a shoulder strap when said seat belt unit is in use, (4) a fourth seat belt having a first end fixed to the back support section of said seat unit adjacent to the second side wall of the back support section and a second end, (5) a fifth seat belt having a body with a first end fixed to the seat section at a location that is spaced apart from the second side wall and is located near the transverse centerline of the seat section, and a second end, the fifth seat belt having a first section of hook-and-loop fastener material thereon adjacent to the second end of the fifth seat belt and a second section of hook-and-loop fastener material thereon at a location spaced apart from the first section of hook-and-loop material of the fifth seat belt, the first section of hook-and-loop fastener material of the fifth seat belt being adapted to releasably engage the second section of hook-and-loop material of the fifth seat belt to releasably attach the second end of the fifth seat belt to the body of the fifth seat belt, the fourth and fifth seat belts being a lap belt when said seat belt unit is in use, (6) a sixth seat belt having a first end fixed to the front surface of the back support section at a location that is spaced apart from the first end of the fourth seat belt, the sixth seat belt has a second end and is a shoulder strap when said seat belt unit is in use, (7) a first ring to which is attached the second ends of the first and third seat belts and to which is releasably attached the second end of the second seat belt when said seat belt unit is in use, and (8) a second ring to which is attached the second ends of the fourth and sixth seat belts and to which is releasably attached the second end of the fifth seat belt when said seat belt unit is in use.

2. A bus seat belt system comprising:

(a) a vehicle seat unit which includes a back section and a seat section;

(b) a seat belt unit which includes (1) a first lap belt element which is fixedly attached to said vehicle seat unit, (2) a second lap belt element which is fixedly attached to said vehicle seat unit, (3) a shoulder belt element which is fixedly attached to said vehicle seat unit;

(c) a ring which is fixedly attached to the first lap belt element and to the shoulder belt element; and (d) the second lap belt element having a second end which includes hook-and-loop fastener elements and which is releasably attached to said ring.

\* \* \* \* \*